April 5, 1960

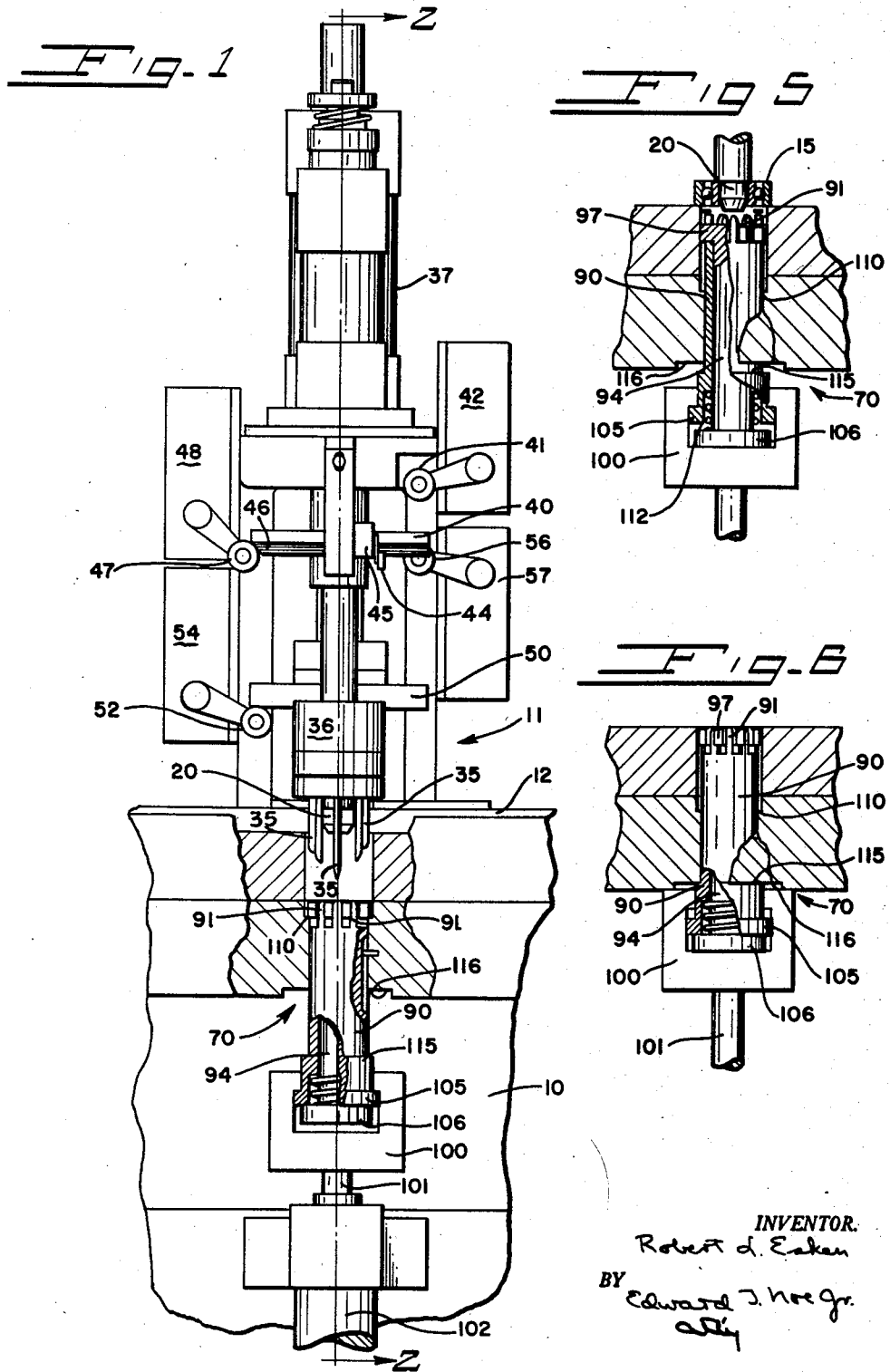

R. L. ESKEN 2,931,095

ASSEMBLY APPARATUS

Filed Dec. 13, 1956

4 Sheets-Sheet 2

INVENTOR.
Robert L. Esken
Edward J. Noeger
BY
ATTY

April 5, 1960        R. L. ESKEN        2,931,095
ASSEMBLY APPARATUS
Filed Dec. 13, 1956        4 Sheets-Sheet 3
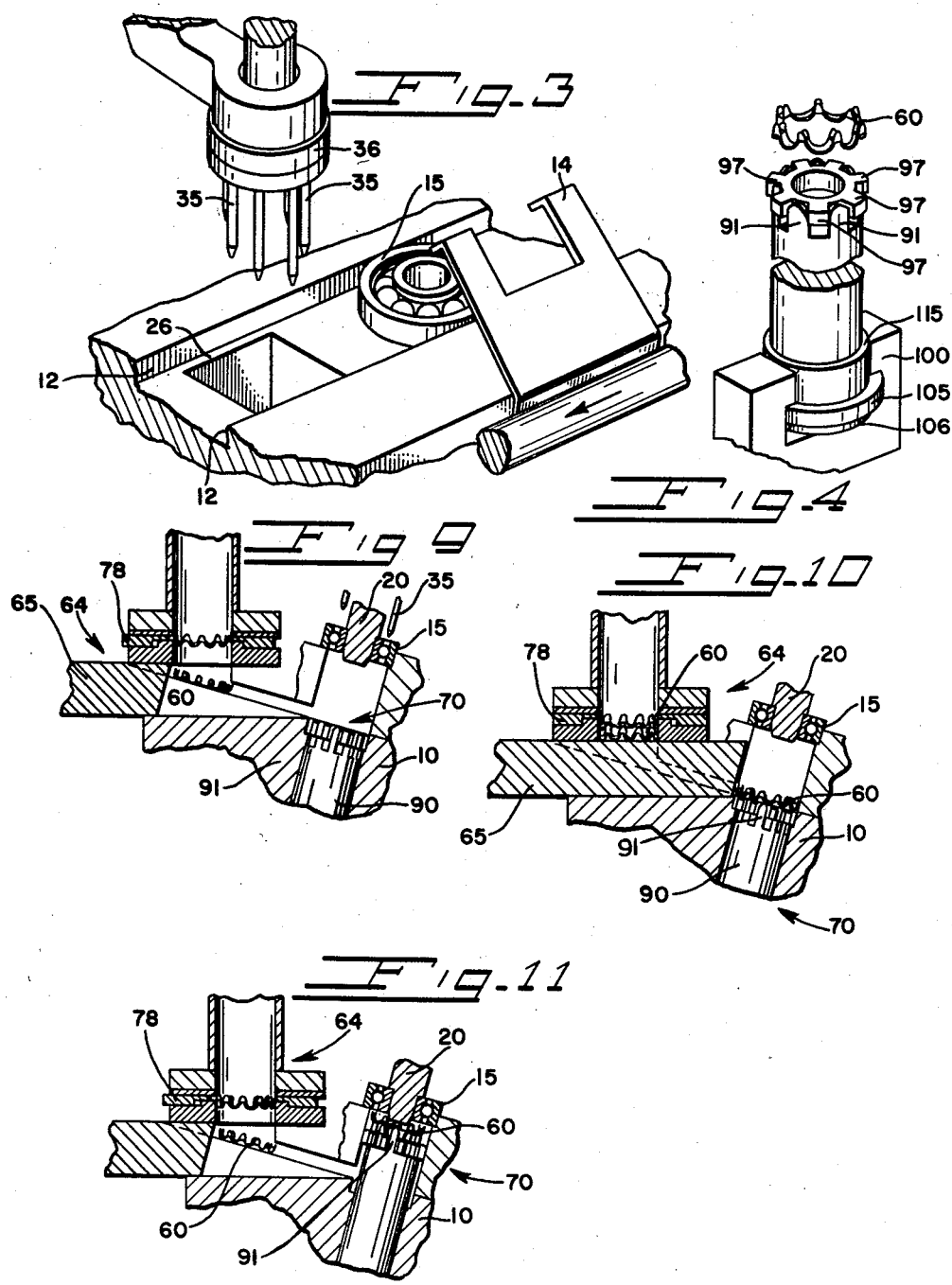
INVENTOR.
Robert L. Esken
BY Edward J. Noe Jr.
atty April 5, 1960 R. L. ESKEN 2,931,095
ASSEMBLY APPARATUS
Filed Dec. 13, 1956 4 Sheets-Sheet 4
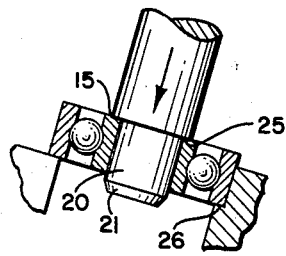
Fig. 12
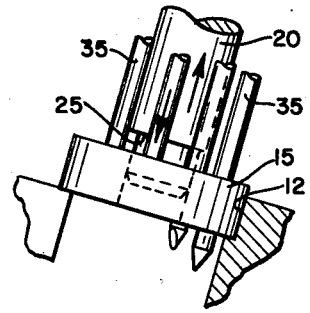
Fig. 13
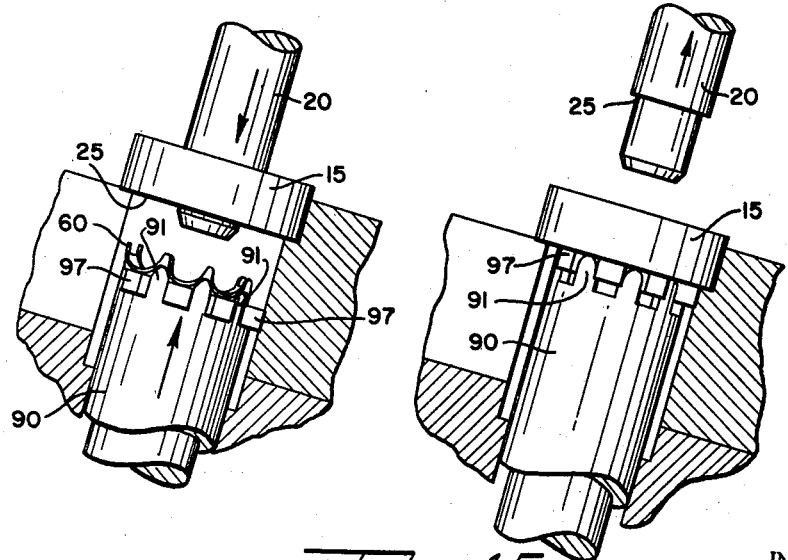
Fig. 14
Fig. 15
INVENTOR.
Robert L. Esken
BY
Edward J. Koeger
Atty ём
United States Patent Office 2,931,095
Patented Apr. 5, 1960

2,931,095

ASSEMBLY APPARATUS

Robert L. Esken, Clayton, Ohio, assignor, by mesne assignments, to The Sheffield Corporation, a corporation of Delaware Application December 13, 1956, Serial No. 628,052

12 Claims. (Cl. 29—201)

This invention relates to an apparatus for use in assembling parts and more particularly to an apparatus for handling and assembling components of anti-friction bearings.

It is an object of this invention to provide an apparatus for feeding, handling and assembling cooperating components, the apparatus having particular application to the feeding of separators or cages for anti-friction bearings, the orientation of separators and anti-friction elements, and the assembly of these components.

It is a further object to provide an apparatus for sequentially feeding parts such as bearing separators in an assembly operation, the apparatus including transfer and escapement means cooperating to feed and transfer a single part at a time from the lower end of a stack of similar parts by means of a simple and reliable structure.

It is a further object to provide an apparatus for relatively orienting anti-friction elements of a bearing assembly and a cooperating cage or separator, and bringing the components into proper cooperating relationship in an automatic assembly operation.

Other objects and advantages will be apparent from the following description, the appended claims, and the accompanying drawings, in which, Figure 1 is a front view, in elevation and partially broken away to central section, showing an apparatus for feeding and locating bearing separators embodying the present invention.

Figure 7:
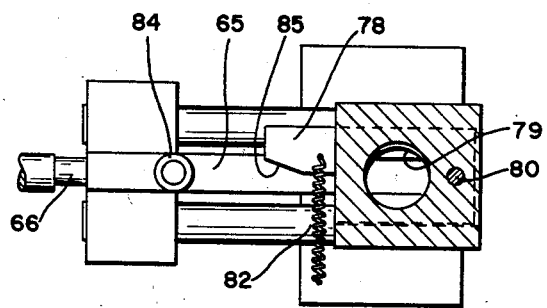
Figure 8:
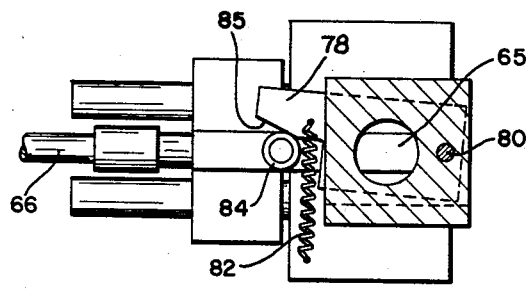
Figure 2:
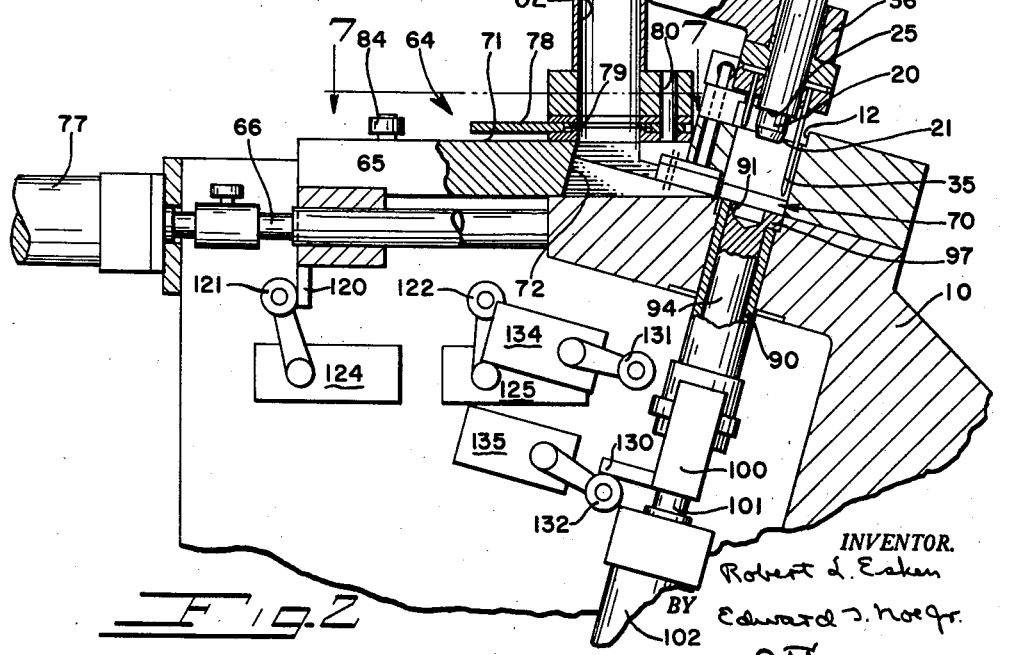

Figure 2 is a longitudinal central section of the apparatus taken on line 2—2 of Figure 1, Figure 3 is a fragmentary perspective of a portion of the apparatus, Figure 4 is a perspective view illustrating the major components involved in the orienting and locating of a bearing separator, Figures 5 and 6 show the lower portion of the apparatus of Figure 1 in different operating positions, Figure 7 is a sectional view on line 7—7 of Figure 2 showing the separator escapement apparatus in one position of actuation, Figure 8 illustrates the mechanism of Figure 7 in releasing position, Figures 9, 10 and 11 show the feeding, orienting and locating structure in different positions of operation, and Figures 12 to 15 diagrammatically illustrate the operations of the apparatus during orientation and location of a ball bearing separator.

While the present invention is adaptable to many different embodiments and uses, it has particular application in a comprehensive automatic assembly operation where bearing rings are gaged, selected balls are placed between the rings, and separators are placed in position and crimped together to complete the assembly. An example of an apparatus for carrying out such an operation is illustrated and described in more detail in co-pending application Serial No. 628,468, filed on Dec. 14, 1956.

In such an exemplary assembly operation the raceways of inner and outer rings are first matched or compared and selected size balls are automatically placed between the rings. The present invention provides the structure for then placing the separators or cages in association with the bearing balls. After the separators are located they are crimped together by conventional structure.

In the operation of the present invention an assembly comprising an inner and outer ring with random spaced balls is transferred or placed in operating position. The balls are then properly spaced between the rings and held in their spaced positions. A bearing separator is fed from the lowest end of an available stack of separators onto an orienting and locating assembly. Orienting fingers of the assembly are then projected to carry the separator upward into association with the positioned balls while simultaneously orienting the separator rotationally to correspond with the ball positions. When the separator is in its upward position leveling projections are automatically brought into the plane of the orienting fingers to provide a suitable substantially flat surface so that the partially assembled bearing can be transferred therefrom for a subsequent operation. The feeding portion of the present structure can also be used in feeding the opposed separator into position over the bearing assembly where it is dropped and orients itself by gravity.

While further details of the comprehensive assembly machine and transfer mechanism are shown in the co-pending application referred to above the present apparatus includes a base 10 supporting an assembly structure 11 embodying the present invention. Tracks or guides 12 extending transversely through the apparatus locate an inner ring, outer ring, and ball assembly as it is transferred from station to station by feed fingers such as those indicated at 14. As an initial step in the operation such an assembly is positioned in association with the structure of Figure 1.

A bearing assembly 15 is shown in Figure 3 in position for transfer into operating position.

Upon arrival of the bearing assembly 15 in operating position and after the transfer fingers 14 have retracted a plunger 20 having a tapered lower end 21 is projected downwardly into the inner ring to locate the assembly concentrically with the apparatus. Plunger 20 is extended when air is supplied to the upper end of air cylinder 22. Figure 12 illustratates, in fragment, the forward plunger position. Plunger 20 has a shoulder 25 adjacent its lower end which engages the adjacent face of the inner ring urging it downward and, acting through the bearing balls, urging the outer ring against surface 26 provided on the transfer track 12 (see Figure 12). Cylinder 22 contains a piston 27 (see Figure 2) and has a connecting rod 28 extending along its length. A spring 29 cooperates between a fixed member 30 and a flange 32 on rod 28. After the forward stroke when air is released from cylinder 22 spring 29 retracts plunger 12 slightly to relieve the force application of shoulder 25 freeing the balls while maintaining the lower end of the plunger within the inner ring as seen in Figure 13.

Ball orienting fingers 35 mounted on a carrier 36 actuated by cylinder 37 are then projected downward to relatively space the randomly located balls and orient them in the apparatus. The forward finger 35 as seen in Figure 1 is the longest and the fingers decrease in length to each side and to the rear. The forward finger 35 of the assembly enters between the balls first and as the rearward fingers progressively enter the space between the rings the other balls are progressively oriented. The downward positions of fingers 35 are diagrammatically indicated in Figure 13.

Plunger 20 is then once more extended to its fullest downward extent to bring shoulder 25 into firm engagement with the inner ring. Because of the relative endwise force on the inner and outer rings the balls are kept in their located positions as fingers 35 are then retracted (see Figure 14). A switch actuating bar 40 movable with plunger 20 engages roller 41 of a switch unit 42 to signal the rearward position of plunger 20. When the plunger is projected downward to bring shoulder 25 into engagement with the inner ring cam surface 46 engages roller 47 and switch unit 48 is actuated. An inclined surface on bar 40 engages roller 44 of unit 45 if the plunger goes down beyond this position to signal that no ring assembly is in position. A similar bar 50 movable with fingers 35 cooperates with roller 52 of switch unit 54 and roller 56 of switch unit 57 in the forward and retracted positions of the fingers respectively.

A stack of bearing separators 60 is supported in a tubular receiver 62 at the rear of the apparatus. Escapement and transfer mechanism 64 feeds separators one at a time into position for movement into association with the bearing components. See particularly Figures 2, 7, and 8. A transfer slide 65 actuated by connecting rod 66 and air cylinder 77 is movable from a retracted position as seen in Figures 2 and 9 forwardly to carry a separator into receiving position over an orienting and locating assembly 70. Slide 65 provides an upper surface 71 which can be moved into supporting relationship with the separator stack and a forward transfer surface 72 for feeding movement of a separator 60.

An escapement plate 78 has a hole 79 therein forming a portion of the wall of the tubular receiver 62 adjacent its lower end and in the plane of the next to bottom separator of the stack. Plate 78 is swingably mounted on pin 80. When slide 65 is in its retracted position plate 78 is biased in a counter clockwise direction as seen in Figure 7 by a spring 82 thus gripping a separator in cooperation with the walls of receiver 62. This situation is shown most particularly in Figures 7 and 9.

Upon advance of slide 65 to move a separator 60 into receiving position roller 84 engages a cam surface 85 on plate 78 and rocks the plate to the position of Figures 8 and 10, placing hole 79 in coaxial relation with receiver 62 and releasing the separator stack which then drops downward onto the upper surface of slide 65. After its forward transfer movement slide 65 is retracted. During the first portion of its return cam surface 85 is released and the next to bottom separator is gripped. As slide 65 retracts to the position of Figure 2 the bottom separator then drops into a position in association with transfer surface 72 of the slide for forward feeding movement. Slide 65 is shown in Figure 10 at its fullest forward position with the stack released and supported on its upper surface 71. In Figure 11 the slide is again retracted, and another separator 60 is in position for transfer as the bottom separator is gripped to retain the stack.

When the separator is transferred to a position over orienting and locating assembly 70 its scallops or ball receiving pockets are in random orientation and do not necessarily correspond with the positions of the balls as previously located. Assembly 70 is provided to orient the scallops and carry the separator into position with the bearing balls.

Assembly 70 is illustrated in detail in Figures 1, 2, and 4. The assembly comprises an outer orienting sleeve 90 having a plurality of projecting orienting fingers 91 at its upper end. A leveling shaft 94 is slidably supported within sleeve 90.

Shaft 94 has leveling projections 97 extending radially between and beyond the orienting fingers 91 of the assembly. Projections 97 are of less extent along the axis of the assembly than orienting fingers 91. Assembly 70 is slidably guided in base 10 for movement toward and from the supported bearing components. Yoke 100, actuated by connecting rod 101 and air cylinder 102, cooperates with flanges 105 and 106 at the lower ends of sleeve 90 and shaft 94 respectively. When yoke 100 is in its lower position as seen in Figures 1 and 2 it engages flange 105 maintaining the lower end of sleeve 90 against flange 106 of shaft 94 to draw projections 97 into engagement with a shoulder 110 on the fixed structure. Leveling projections 97 and fingers 91 are then in substantially flush relationship so that a separator will slide thereon upon forward movement of slide 65.

As yoke 100 moves upward the components of assembly 70 assume the relative positions of Figure 5. Flange 106 of shaft 94 engages the lower surface of the yoke while flange 105 engages the upper surface. When yoke 100 starts upward sleeve 90 and orienting fingers 91 move upward relative to projections 97 and shaft 94 until flange 106 of shaft 94 engages the lower portion of the yoke as seen in Figure 5. Spring 112 cooperates between shaft 94 and sleeve 90.

Fingers 91 are then projected to cooperate with the scallops or ball pockets of separator 60 as shown in Figures 4, 10, and 14 to rotationally orient the scallops to correspond with the positions of the balls in the bearing assembly above. Assembly 70 continues its upward movement with its components in the relative positions of Figure 5 to carry the separator into association with the balls. The movement of fingers 91 and sleeve 90 is stopped when a shoulder 115 on sleeve 90 engages a surface 116 on the base 10.

As yoke 100 continues its upward movement it engages flange 106 and moves shaft 94 upward within sleeve 90 to carry leveling projections 97 once again into flush relation with fingers 91. This association is shown in Figure 15. At this point a level supporting structure is provided maintaining the lower separator surface flush with the lower surface of the bearing rings and with tracks 12 of the transfer structure for transfer. Thus the balls are oriented and the separator is located. Upon retraction of plunger 20 the bearing assembly can be transferred to a subsequent station. Retraction of yoke 100 restores the orienting and locating assembly 70 to its previous position.

In the operation of the apparatus previously described partially assembled ball bearing units including an inner ring, an outer ring, and balls randomly spaced therebetween are sequentially brought into position by transfer mechanism including feed fingers 14. Plunger 20 is then extended into the inner ring to locate the assembly coaxially with the apparatus and the extending pressure in cylinder 22 is relieved so that spring 29 can back off plunger 20, relieving end pressure against the bearing components while maintaining the assembly in position. Fingers 35 on carrier 36 are then projected to properly space the balls within the rings. Plunger 20 is once again forced downwardly to clamp the balls in the located positions and fingers 35 are retracted.

Transfer slide 65 is moved forward to carry a separator into a receiving position over orienting and locating assembly 70. As slide 65 moves forward plate 78 is rocked to release the separator stack downward against the top of the slide. As the slide is retracted the next to bottom separator is gripped by hole 79 in plate 78 and the bottom separator drops into transfer position in front of the slide.

Cylinder 102 is then energized and yoke 100 starts upward, initially projecting orienting fingers 91 to rotationally orient the separator and carry it upward into association with the located balls. Leveling projections 97 are then moved into the planes of the finger tips to provide a substantially level surface allowing further transfer of the partially assembled ball components after plunger 20 is retracted.

Arm 120 on slide 65 cooperates with rollers 121 and 122 of switch units 124 and 125 to signal the retracted and advanced positions of the slide. Similarly arm 130 connected to yoke 100 actuates rollers 131 and 132 of switch units 134 and 135 to signal the up and down positions of the yoke. Through the electrical signals provided by the electrical switches of the apparatus and a conventional electrical circuit the relative timing of the actuation of the components is accomplished.

Thus it is seen that an apparatus has been provided for accomplishing in a simple and reliable manner the handling, orienting, and positioning of difficult components. Through this unique structure bearing balls are precisely located and held in position and a bearing separator is oriented and fed into association therewith.

While the apparatus herein described constitutes a preferred embodiment of the invention, it is to be understood that the invention is not limited to the precise apparatus described and that changes may be made therein without departing from the scope of the invention which is described in the appended claims.

What is claimed is:

1. Apparatus for relatively spacing and locating antifriction elements between inner and outer bearing rings in an assembly operation, comprising a base, support means on said base for engagement with one face of one of the rings while clearing the other, means on said base for orienting the rings in substantially concentric relationship, spacing fingers movable between the rings to relatively space the antifriction elments, force applying means for engagement with the opposite face of the other of said rings while clearing said one ring to provide an axial force therebetween, and actuating means operatively connected to first insert said fingers between said rings, and then apply said force applying means and retract said spacing fingers, whereby the elements are properly spaced and held in position.

2. Apparatus for relatively spacing and locating bearing balls between inner and outer bearing rings in an assembly operation, comprising a base, support means on said base for engagement with the face of the outer ring at one end of the bearing assembly, an orienting plunger having a tapered outer end, means on said base supporting and actuating said plunger for projection into the inner bearing ring, spacing fingers supported for movement between the rings to relatively space the bearing balls, said plunger having a shoulder therein for engagement with the face of the inner ring at the opposite end of the bearing assembly, and actuating means operatively connected to said plunger and said fingers to forceably apply said shoulder to the inner bearing ring and retract said spacing fingers, whereby the balls are properly spaced and held in position.

3. Apparatus as set forth in claim 2 wherein said actuating means includes a fluid cylinder, a piston movable therein connected to project and retract said plunger, and spring means of predetermined length cooperating between said base and plunger operative to retract said plunger a predetermined amount, whereby upon application of pressure to one end of said cylinder the plunger shoulder is projected into engagement with the inner ring and upon release of pressure said spring means automatically retracts said plunger a predetermined amount to maintain the plunger within the ring while relieving the endwise force applied thereto.

4. Apparatus for relatively orienting and assembling a separator and antifriction elements in an assembly operation comprising a base, supporting means on said base for a bearing assembly including inner and outer rings and antifriction elements, orienting means on said base for engaging and spacing said elements within the rings and in reference positions in the apparatus, separator feed means on said base including escapement means for releasing and feeding one separator at a time, and separator locating means including means for orienting a separator substantially co-axially with said rings and rotationally positioned to correspond with the reference positions of said elements and then moving the separator axially into association with the located antifriction elements.

5. Apparatus for placing a separator in association with antifriction elements of a bearing in an assembly operation, comprising a base, means on said base for supporting inner and outer bearing rings and antifriction elements in assembled relationship, spacing means for engaging and spacing the antifriction elements in a predetermined relationship and location in the apparatus, separator supply means including orienting contact means for engaging and orienting each separator to correspond with the located antifriction elements, said separator supply means including actuating means for moving the oriented separator into association with the located antifriction elements.

6. Apparatus for orienting and feeding a bearing separator or the like into association with antifriction elements of a bearing in an assembly operation comprising a base, means on said base for receiving a separator to be fed, orienting fingers for orienting engagement with the separator scallops, and actuating means operatively connected to project said fingers into supporting engagement with the separator scallops whereby the separator is rotationally oriented and carried into association with the components of a bearing assembly.

7. Apparatus for orienting and feeding a ball bearing separator into association with the balls of a bearing in an assembly operation, comprising a base, means on said base for receiving a separator to be fed, circularly spaced orienting fingers for cooperation with the space between ball receiving pockets or scallops of a separator, leveling means cooperating with said fingers, and actuating means operatively connected to said fingers and said leveling means for projecting said fingers into supporting engagement with a separator whereby the separator is rotationally oriented and for relatively moving said leveling means and fingers into relative flush relationship to provide a substantially flat supporting surface for the oriented separator.

8. Apparatus for orienting and feeding a ball bearing separator for assembly operation, comprising a base, means on said base for receiving a separator to be fed, a sleeve having spaced orienting fingers projecting at one end, a shaft fitted within said sleeve having leveling projections extending between said fingers, said leveling projections being of less extent along the axis of the assembly than the orienting fingers, and actuating means connected to said sleeve and shaft for relative axial movement thereof, whereby said fingers can be projected to engage and orient a bearing separator and said leveling projections brought into flush relationship therewith for support of a separator.

9. Apparatus for placing a bearing separator in association bearing balls in an assembly operation comprising a base, supporting means on said base for engagement with the face of an outer bearing ring at one end of a partially assembled bearing including inner and outer rings and balls assembled therebetween, an orienting plunger, means on said base supporting and actuating said plunger for projection into the inner ring of the assembly, spacing fingers supported for movement between the rings to relatively space the bearing balls, said plunger having a shoulder thereon for engagement with the face of the inner ring at the oposite end of the bearing assembly, actuating means operatively connected to said plunger and said fingers to forceably apply said shoulder to the inner bearing ring and retract said spacing fingers, whereby the balls are properly spaced and held in position, and separator supply means including orienting contact means for engaging and orienting each separator co-axially with and rotationally positioned to correspond with the located balls, said separator supply means including support means for moving the oriented separator axially into assembled relation with the located balls.

10. Apparatus for placing a bearing separator in association with bearing balls in an assembly operation comprising a base, support means on said base for engagement with the face of an inner ring at one end of a bearing assembly, comprising inner and outer rings with balls therebetween, spacing fingers movable on said base from a retracted position forward between said rings to relatively space the bearing balls in reference positions between said rings and in the apparatus, force applying means for applying a relative endwise force between the bearing rings to maintain the balls in proper spaced relation as said fingers are retracted, means on said base for feeding bearing separators, receiving means for said separators, circularly spaced orienting fingers for cooperation with the space between ball receiving pockets or scallops of a separator to rotationally position the separator to correspond to the located balls, leveling means cooperating with said fingers, and actuating means operatively connected to said fingers and said leveling means for projecting said fingers into supporting engagement with the separator for orientation and movement thereof into association with the located bearing balls and for then carrying the leveling means into relatively flush relationship with the fingers to provide a substantially flat supporting surface for the oriented separator.

11. Apparatus for placing a separator in association with antifriction elements of a bearing in an assembly operation, comprising a base, means on said base for supporting inner and outer bearing rings and antifriction elements in assembled relationship, spacing means for engaging and spacing the antifriction elements in a predetermined relationship and location in the apparatus, separator supply means including an orienting assembly movable co-axially toward and from said supporting means, said assembly comprising an orienting sleeve having fingers projecting at one thereof at a predetermined relation to said spacing means for orienting engagement with a bearing separator, a shaft fitted within said sleeve having leveling projections at one end thereof extending radially between said fingers and beyond said sleeve, means supporting said orienting assembly coaxially below said supporting means, actuating means operatively associated with said sleeve and shaft to position said fingers and leveling projection in relatively flush relationship below said bearing components for receiving a separator, separator supply means for placing a separator over the upper end of said assembly, and actuating means operatively connected to said sleeve and shaft including means to project said sleeve and fingers to rotationally orient and carry a separator into association with the components of the bearing assembly and to then move said shaft to bring said projections into flush relationship with said fingers to provide a supporting surface for transfer of the bearing assembly laterally therefrom.

12. Apparatus for orienting and relatively locating bearing balls and a bearing separator in an assembly operation comprising a base, support means on said base for supporting an inner ring, an outer ring, and balls assembled therebetween, said support means providing a surface for engagement with one face of one of the rings, circumferentially arranged spacing fingers movable between the rings to relatively space the balls, force applying means for engagement with the opposite face of the other of said rings, actuation means operatively connected to apply said force applying means and retract said spacing fingers, whereby the balls are properly oriented in the apparatus and held in position, means on said base for supporting a stack of separators, transfer means movable under said stack, drive means for moving said transfer means from a retracted position forward into a supporting relationship with the lower end of the stack while simultaneously transferring a separator, retaining means for gripping the next to bottom separator in the stack, interconnection means between said transfer and retaining means for releasing the retaining means upon movement of the transfer means forward into supporting relationship with the separator stack and for gripping the next to bottom separator as the transfer means is retracted, means for receiving a separator transferred from said stack including orienting contact means circumferentially spaced at a predetermined relation to said spacing fingers and co-axial therewith movable axially upward to engage and orient each separator to correspond with the located balls and to carry the separator into association therewith, and leveling means cooperating with said contact means to support said located separator and providing a substantially level supporting surface therefor.

References Cited in the file of this patent

UNITED STATES PATENTS

| | | |
|---|---|---|
| 608,611 | Klahn | Aug. 9, 1898 |
| 1,723,369 | Pew | Aug. 6, 1929 |
| 2,068,683 | Ketcham | Jan. 26, 1937 |
| 2,075,050 | Nowinski | Mar. 30, 1937 |
| 2,204,655 | Booty | June 18, 1940 |
| 2,255,626 | Ortegren | Sept. 9, 1941 |
| 2,311,251 | Rees | Feb. 16, 1943 |